United States Patent
Xu et al.

(10) Patent No.: US 8,858,905 B2
(45) Date of Patent: Oct. 14, 2014

(54) SYSTEM AND PROCESS FOR TRAPPING SULFUR DIOXIDE AND CARBON DIOXIDE BY AMMONIA ABSORPTION AT ATMOSPHERIC PRESSURE

(75) Inventors: Jingyao Xu, Huainan (CN); Lin Chen, Huainan (CN); Mingxu Zhang, Huainan (CN); Song Han, Huainan (CN); Chuanhao Su, Huainan (CN); Fanfel Min, Huainan (CN); Hanxu Li, Huainan (CN)

(73) Assignee: Anhui Huaihua Co. Ltd., Huainan, Anhui (CN)

( * ) Notice: Subject to any disclaimer, the term of this patent is extended or adjusted under 35 U.S.C. 154(b) by 0 days.

(21) Appl. No.: 14/000,162

(22) PCT Filed: Feb. 10, 2012

(86) PCT No.: PCT/CN2012/071026
§ 371 (c)(1),
(2), (4) Date: Oct. 28, 2013

(87) PCT Pub. No.: WO2012/109964
PCT Pub. Date: Aug. 23, 2012

(65) Prior Publication Data
US 2014/0050651 A1    Feb. 20, 2014

(30) Foreign Application Priority Data

Feb. 16, 2011    (CN) .......................... 2011 1 0039363
Feb. 16, 2011    (CN) ...................... 2011 2 0040452 U

(51) Int. Cl.
| | |
|---|---|
| B01D 53/50 | (2006.01) |
| B01D 53/62 | (2006.01) |
| B01D 53/74 | (2006.01) |
| B01D 53/75 | (2006.01) |
| B01D 53/78 | (2006.01) |
| F23J 15/04 | (2006.01) |

(52) U.S. Cl.
CPC ................ B01D 53/62 (2013.01); B01D 53/75 (2013.01); B01D 53/78 (2013.01); *Y02C 10/04* (2013.01); *B01D 53/504* (2013.01); *F23J 15/04* (2013.01); *B01D 2258/0283* (2013.01); *B01D 2251/2062* (2013.01); *B01D 53/507* (2013.01)
USPC ........ 423/220; 423/234; 423/243.06; 422/168; 422/169; 422/170; 422/172

(58) Field of Classification Search
USPC ............. 423/220, 234, 243.06; 422/168–170, 422/172
See application file for complete search history.

(56) References Cited

U.S. PATENT DOCUMENTS

| | | | |
|---|---|---|---|
| 7,867,322 B2 * | 1/2011 | Gal | 95/199 |
| 8,329,128 B2 * | 12/2012 | Dube et al. | 423/220 |
| 2013/0136680 A1 * | 5/2013 | Nagayasu et al. | 423/220 |

FOREIGN PATENT DOCUMENTS

| | | |
|---|---|---|
| CN | 101229475 A | 7/2008 |
| CN | 100551494 C | 10/2009 |

(Continued)

*Primary Examiner* — Timothy Vanoy

(57) ABSTRACT

A system and a process for capture and absorption of sulfur dioxide and carbon dioxide by an ammonia method at normal pressure are disclosed. The system has a dilute ammonia water supply device connected with sulfur dioxide and carbon dioxide absorption devices; an induced draft fan is connected with a heat exchanger connected with the sulfur dioxide absorption device; a sulfur dioxide absorption tower is connected with a carbon dioxide absorption tower; cooling devices in the sulfur dioxide and carbon dioxide absorption towers share a cooling water inlet and outlet pipe; the sulfur dioxide and carbon dioxide absorption devices respectively restore ammonia concentration to original ammonia water concentration by supplementing concentrated ammonia water; the sulfur dioxide and carbon dioxide absorption devices respectively pump solutions into the heat exchangers, then the solutions enter crystallization tanks; solid-liquid separation is performed through centrifuges, and the liquid continues to circulate in the system.

5 Claims, 1 Drawing Sheet

(56) References Cited

FOREIGN PATENT DOCUMENTS

| CN | 201543378 U | 8/2010 |
| CN | 102120137 A | 7/2011 |
| CN | 202006081 U | 10/2011 |

* cited by examiner

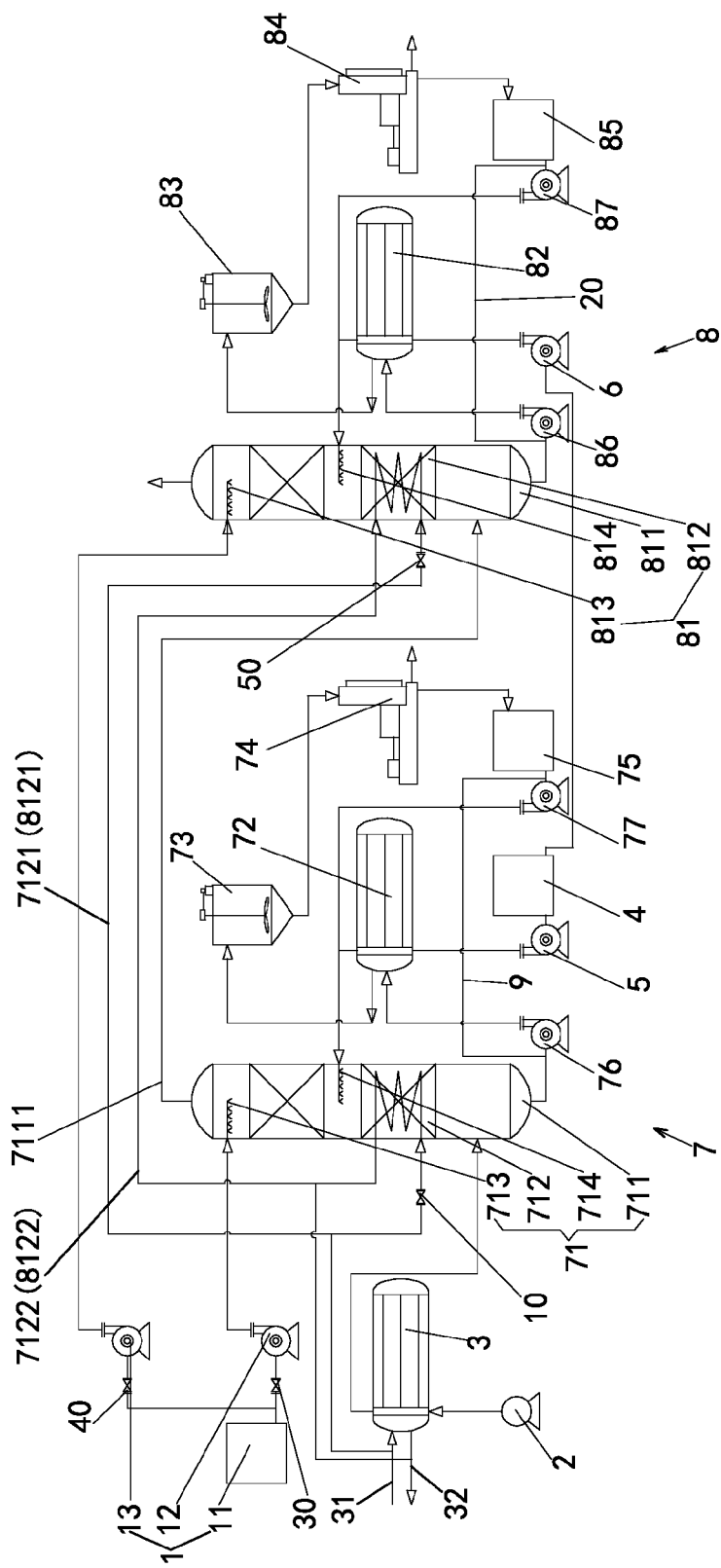

SYSTEM AND PROCESS FOR TRAPPING SULFUR DIOXIDE AND CARBON DIOXIDE BY AMMONIA ABSORPTION AT ATMOSPHERIC PRESSURE

CROSS REFERENCE OF RELATED APPLICATION

This is a U.S. National Stage under 35 U.S.C 371 of the International Application PCT/CN2012/071026, filed Feb. 10, 2012, which claims priority under 35 U.S.C. 119(a-d) to CN 201120040452.4 and CN 201110039363.2, filed Feb. 16, 2011.

BACKGROUND OF THE PRESENT INVENTION

1. Field of Invention

The present invention relates to a field of chemical or biological purification of waste gas by gas-liquid contact, and in particular, relates to a system and a process for capture and absorption of sulfur dioxide and carbon dioxide by an ammonia method at normal pressure.

2. Description of Related Arts

At present, the emission reduction of sulfur dioxide and carbon dioxide is in general performed separately, that is, first perform desulfurization and then perform decarbonization. The flue gas desulfurization techniques mainly include limestone-gypsum wet method, rotary spraying semi-dry method, in-furnace limestone injection and tail-section humidifying activation, seawater desulfurization, electron beam desulfurization, circulating fluidized bed flue gas desulfurization, and the like. Among which, the wet-type limestone method is at present the most widely used tail-section flue gas desulfurization technique around the world. In this technique lime slurry or lime is used to absorb sulfur dioxide in the flue gas in an absorption tower, resulting in the products of calcium sulfite and calcium sulfate, with the desulfurization efficiency of 75%-95%. The main problems of this method are the low dissolubility and utilization efficiency of absorption agent (lime or limestone), and large amounts of ash produced, causing the desulfurization equipment and pipeline prone to scaling and plugging, and it also produces secondary pollution caused by the process products. In the dry and the semi-dry desulfurization methods, due to the short contact time between the absorption agent and the flue gas, the desulfurization efficiency is generally in the range of 50%-75%, a low desulfurization efficiency, and there is also secondary pollution of solid pollutants. The recovery methods mainly include Wellman-Lord method, activated carbon method, ammonia method, and the like. In the Wellman-Lord method, sodium sulfite is used as the absorption agent, and the desulfurization efficiency can reach 95%, but the investment and operation costs are relatively high. In the activated carbon method, although the desulfurization efficiency can reach 98%, the process is complex, along with great technical difficulty and high consumption of activated carbon. In the ammonia method, the desulfurization efficiency is generally in the range of 95%-99%, the desulfurization product can be directly used as fertilizer, and no waste water or other wastes are produced. The ammonia method has incomparable advantages over other techniques, but this method often has the problem of relatively high loss of ammonia in the tail gas, which may directly lower the desulfurization efficiency. The carbon reduction techniques both at home and abroad mainly include absorption method, adsorption method, membrane separation method, storage method, and the like, but there are certain shortcomings for each of these methods.

SUMMARY OF THE INVENTION

The present invention aims at providing a system and a process for capture and absorption of sulfur dioxide and carbon dioxide by an ammonia method at normal pressure, which have the advantages of high desulfurization and carbon reduction efficiency, simple process flow, simplified system structure, and low investment and operation costs.

In order to realize the above-mentioned scheme, the technical solution of the present invention is set as follows. A system for the capture and absorption of sulfur dioxide and carbon dioxide by an ammonia method at normal pressure comprises a dilute ammonia water supply device, a sulfur dioxide absorption device, and a carbon dioxide absorption device. Wherein the sulfur dioxide absorption device comprises a normal-pressure sulfur dioxide absorption tower, a second heat exchanger, a sulfur dioxide crystallization tank, an ammonium sulfate product centrifuge, a first mother liquor tank, a fifth and a sixth pumps, wherein the sulfur dioxide absorption tower comprises a first tank body, a first cooling device positioned inside the first tank body, and a first and a second spraying devices positioned inside and at the upper part and the middle part of the first tank body respectively. The carbon dioxide absorption device comprises a normal-pressure carbon dioxide absorption tower, a third heat exchanger, a carbon dioxide crystallization tank, an ammonium bicarbonate product centrifuge, a second mother liquor tank, a seventh and an eighth pumps, wherein the carbon dioxide absorption tower comprises a second tank body, a second cooling device positioned inside the second tank body, and a third and a fourth spraying devices positioned inside and at the upper part and the middle part of the second tank body respectively. The dilute ammonia water supply device is respectively connected with the first and the third spraying devices through pipelines, an induced draft fan is connected with the gas inlet of a first heat exchanger through a pipeline, the exhaust port of the first heat exchanger extends into the lower part of an inner cavity of the first tank body through a pipeline, the bottom of the first tank body is connected with the inlet of the fifth pump through a pipeline, the outlet of the fifth pump is connected with the inlet of the second heat exchanger through a pipeline, the outlet of the second heat exchanger is connected with the inlet of the sulfur dioxide crystallization tank through a pipeline, the outlet of the sulfur dioxide crystallization tank is connected with the inlet of the ammonium sulfate product centrifuge through a pipeline, the outlet of the ammonium sulfate product centrifuge is connected with the inlet of the first mother liquor tank through a pipeline, the outlet of the first mother liquor tank is connected with the sixth pump through a pipeline, the sixth pump is connected with the second spraying device through a pipeline, a first pipeline is connected between the inlets of the fifth and the sixth pumps, a high-concentration ammonia water storage tank is respectively connected with the inlets of the first and the second pumps through pipelines, the outlets of the first and the second pumps are respectively connected with the second and the fourth spraying devices, the upper part of the first tank body is communicated with the lower part of the inner cavity of the second tank body through an exhaust pipe, the first and the second cooling water inlet pipes on the first and the second cooling devices are connected together with a cooling water inlet pipe of the first heat exchanger, the first and the second cooling water outlet pipes on the first and the second cooling devices are connected together with a cooling water outlet pipe of the first heat exchanger, the first and the second regulating valves are respectively arranged on the first and the second cooling water inlet pipes, the bottom of the second tank body is connected with the inlet of the seventh pump through a pipeline, the outlet of the seventh pump is connected with the inlet of the third heat exchanger through a pipeline, the outlet of the third heat exchanger is connected with the inlet of the carbon dioxide crystallization tank through a pipeline, the outlet of the carbon dioxide crystallization tank is connected with the inlet of the ammonium bicarbonate product centrifuge through a pipeline, the outlet of the ammonium bicarbonate product centrifuge is connected with the inlet of the second mother liquor tank through a pipeline, the outlet of the second mother liquor tank is connected with the eighth pump through a pipeline, the eighth pump is connected with the fourth spraying device through a pipeline, and a second pipeline is connected between the inlets of the seventh and the eighth pumps.

According to the system of the present invention for the capture and absorption of sulfur dioxide and carbon dioxide by the ammonia method at normal pressure, the dilute ammonia water supply device comprises a dilute ammonia water storage tank, and a third and a fourth pumps, wherein the dilute ammonia water storage tank is respectively connected with the inlets of the third and the fourth pumps through pipelines, the outlets of the third and the fourth pumps are respectively connected with the first and the third spraying devices, and the first and the second valves are respectively arranged on the pipelines between the dilute ammonia water storage tank and the third and the fourth pumps.

A process for capture and absorption of sulfur dioxide and carbon dioxide by an ammonia method at normal pressure comprises following steps of:

(1) pumping flue gas of coal-fired power plant after dedusting treatment into a first heat exchanger via an induced draft fan, and cooling the flue gas through the first heat exchanger to a temperature required by a production process;

(2) letting the flue gas of the coal-fired power plant after dedusting and cooling treatment enter a sulfur dioxide absorption tower from the first heat exchanger via a bottom of the sulfur dioxide absorption tower, pumping dilute ammonia water absorption solution capable of capturing and absorbing sulfur dioxide from a dilute ammonia water storage tank into a first spraying device of the sulfur dioxide absorption tower through a third pump and spraying the dilute ammonia water absorption solution downward, thus allowing the flue gas and the dilute ammonia water absorption solution to be in countercurrent contact to undergo gas-liquid dual-phase reaction, and generating an ammonium sulfate solution through absorption of sulfur dioxide, wherein a chemical reaction takes place in two processes: a first process of chemical reaction between the dilute ammonia water and the sulfur dioxide to generate ammonium sulfite, and a second process of chemical reaction between the ammonium sulfite and the ammonia water to generate ammonium sulfate; and then letting the flue gas after a removal of sulfur dioxide enter a carbon dioxide absorption tower through an exhaust pipe;

(3) stopping an injection of the dilute ammonia water absorption solution into the sulfur dioxide absorption tower when unsaturated ammonium sulfate solution in the sulfur dioxide absorption tower reaches a liquid level required by the process;

(4) when spraying downward the dilute ammonia water absorption solution through the first spraying device of the sulfur dioxide absorption tower, pumping the ammonium sulfate solution in the sulfur dioxide absorption tower into a second heat exchanger via a fifth pump for cooling, then sending into a sulfur dioxide crystallization tank, further sending saturated ammonium sulfate crystalline solid and the unsaturated ammonium sulfate solution together into an ammonium sulfate product centrifuge through a pipeline for solid-liquid separation, separating out crystalline solids of ammonium sulfate fertilizer, discharging remaining unsaturated ammonium sulfate solution into a first mother liquor tank through the pipeline, then sucking out and pumping into a second spraying device of the sulfur dioxide absorption tower through a sixth pump for downward spraying, further pumping the unsaturated ammonium sulfate solution at the bottom of the sulfur dioxide absorption tower directly into the second spraying device of the sulfur dioxide absorption tower for downward spraying through the sixth pump on a first pipeline, and allowing countercurrent absorption reaction to occur between the sulfur dioxide gas in the flue gas inside the sulfur dioxide absorption tower and the downward sprayed absorption solutions which include the unsaturated ammonium sulfate solution and the previously sprayed dilute ammonia water absorption solution, with both solutions working either simultaneously or separately, thus achieving absorption of sulfur dioxide and turning the ammonium sulfate solution from the unsaturated solution into the saturated solution;

(5) pumping high-concentration ammonia water from the high-concentration ammonia water storage tank through a first pump, and supplementing the high-concentration ammonia water into the sulfur dioxide absorption tower in which the separation of ammonium sulfate fertilizer product has been completed, thus restoring the concentration of the solution in the sulfur dioxide absorption tower to a concentration level of the dilute ammonia water absorption solution as at the beginning;

(6) allowing the flue gas of the coal-fired power plant after the sulfur dioxide removal treatment, which is exhausted from the exhaust pipe at an upper part of the sulfur dioxide absorption tower, to enter the carbon dioxide absorption tower from the bottom, pumping the dilute ammonia water absorption solution capable of capturing and absorbing carbon dioxide from the dilute ammonia water storage tank into the third spraying device of the carbon dioxide absorption tower through a fourth pump and spraying downward, letting the flue gas and the dilute ammonia water absorption solution be in countercurrent contact to undergo gas-liquid dual-phase reaction, and generating an ammonium bicarbonate solution through the absorption of carbon dioxide, and then exhausting the flue gas after the removal of sulfur dioxide and carbon dioxide through the pipeline at a top of the carbon dioxide absorption tower;

(7) stopping the injection of the dilute ammonia water absorption solution into the carbon dioxide absorption tower when the unsaturated ammonium bicarbonate solution in the carbon dioxide absorption tower reaches the liquid level required by the process;

(8) when spraying downward the dilute ammonia water absorption solution through the third spraying device of the carbon dioxide absorption tower, pumping the ammonium bicarbonate solution in the carbon dioxide absorption tower into the third heat exchanger via a seventh pump for cooling, then sending into the carbon dioxide crystallization tank, further sending the saturated ammonium bicarbonate crystalline solid and the unsaturated ammonium bicarbonate solution together into the ammonium bicarbonate product centrifuge through the pipeline for solid-liquid separation, separating out the crystalline solid of ammonium bicarbonate fertilizer, discharging the remaining unsaturated ammonium bicarbonate solution into a second mother liquor tank through the pipeline, then sucking out and pumping into a fourth spraying device of the carbon dioxide absorption tower through an eighth pump for downward spraying, enabling the unsaturated ammonium bicarbonate solution at the bottom of the carbon dioxide absorption tower to pass through the second pipeline, and directly pumping into the fourth spraying device of the carbon dioxide absorption tower for downward spraying through the eighth pump on the second pipeline, and allowing countercurrent absorption reaction to occur between carbon dioxide gas in the flue gas inside the carbon dioxide absorption tower and the downward sprayed absorption solutions which include the unsaturated ammonium bicarbonate solution and the previously sprayed dilute ammonia water absorption solution, with both solutions working either simultaneously or separately, thus achieving the absorption of carbon dioxide and turning the ammonium bicarbonate solution from the unsaturated solution to the saturated solution;

(9) pumping the high-concentration ammonia water from the high-concentration ammonia water storage tank through the second pump, and supplementing the high-concentration ammonia water into the carbon dioxide absorption tower in which the separation of ammonium bicarbonate fertilizer product has been completed, thus restoring the concentration of the solution in the carbon dioxide absorption tower to the concentration level of the dilute ammonia water absorption solution as at the beginning;

(10) repeating the above steps in a circulating manner.

According to the process of the present invention for the capture and absorption of sulfur dioxide and carbon dioxide by the ammonia method at normal pressure, the reaction temperature in the sulfur dioxide absorption tower is controlled to be within the range of 65-80° C. through the first cooling device, and the reaction temperature in the carbon dioxide absorption tower is controlled to be within the range of 40-50° C. through the second cooling device.

According to the process of the present invention for the capture and absorption of sulfur dioxide and carbon dioxide by the ammonia method at normal pressure, the concentration of the dilute ammonia water solution in either of the sulfur dioxide absorption tower and the carbon dioxide absorption tower is controlled to be within the range of 6%-8% by mass.

By adopting the above scheme, according to the system and the process of the present invention for the capture and absorption of sulfur dioxide and carbon dioxide by the ammonia method at normal pressure, the sulfur dioxide absorption tower and the carbon dioxide absorption tower are employed to allow sulfur dioxide and carbon dioxide in the flue gas of the coal-fired power plant to respectively undergo countercurrent contact and thorough reaction with the dilute ammonia water absorption solution, and respectively generate the ammonium sulfate solution and the ammonium bicarbonate solution; the produced unsaturated ammonium sulfate solution and the ammonium bicarbonate solution are to be used in a flexible manner, the processing step of supplementing the high-concentration ammonia water is added, and the cooling devices are arranged in the sulfur dioxide absorption tower and the carbon dioxide absorption tower; so that the production working conditions required by the process can be well controlled, the sulfur dioxide and carbon dioxide gas in the flue gas of the coal-fired power plant can be well captured and absorbed, the desulfurization and carbon reduction efficiency is high, the emission of the sulfur dioxide and carbon dioxide greenhouse gas is reduced, the ammonium sulfate and ammonium bicarbonate fertilizers are simultaneously produced; the unique design of the process pipeline can enable the capture system to operate flexibly, reduce the power consumption during the operation of the system, and meanwhile, more effectively enhance the capture and absorption capability of the sulfur dioxide and carbon dioxide gas in the flue gas of the coal-fired power plant; and the system and the process of the present invention have simple process flow, simplified system structure, and low investment and operation costs.

These and other objectives, features, and advantages of the present invention will become apparent from the following detailed description, the accompanying drawings, and the appended claims.

BRIEF DESCRIPTION OF THE DRAWINGS

The FIGURE is a structural diagram of a system for capture and absorption of sulfur dioxide and carbon dioxide by an ammonia method at normal pressure according to a preferred embodiment of the present invention.

The present invention is further described through the following embodiments with the combination of the accompanying drawings.

DETAILED DESCRIPTION OF THE PREFERRED EMBODIMENT

As shown in FIGURE, a system for capture and absorption of sulfur dioxide and carbon dioxide by an ammonia method at normal pressure comprises a dilute ammonia water supply device 1, an induced draft fan 2, a first heat exchanger 3, a high-concentration ammonia water storage tank 4, a first pump 5, a second pump 6, a sulfur dioxide absorption device 7, and a carbon dioxide absorption device 8.

The dilute ammonia water supply device 1 comprises a dilute ammonia water storage tank 11, a third pump 12, and a fourth pump 13; the dilute ammonia water storage tank 11 is respectively connected with the inlets of the third pump 12 and the fourth pump 13 through pipelines, and a first valve 30 and a second valve 40 are respectively arranged on the pipelines between the dilute ammonia water storage tank 11 and the third and the fourth pumps 12, 13.

The sulfur dioxide absorption device 7 comprises a normal-pressure sulfur dioxide absorption tower 71, a second heat exchanger 72, a sulfur dioxide crystallization tank 73, an ammonium sulfate product centrifuge 74, a first mother liquor tank 75, a fifth pump 76 and a sixth pump 77, wherein the sulfur dioxide absorption tower 71 comprises a first tank body 711, a first cooling device 712 positioned inside the first tank body 711, and a first spraying device 713 and a second spraying device 714 which are positioned at the upper part and the middle part of the first tank body 711 and the outlet of the third pump 12 is connected with the first spraying device 713 through a pipeline.

The carbon dioxide absorption device 8 comprises a normal-pressure carbon dioxide absorption tower 81, a third heat exchanger 82, a carbon dioxide crystallization tank 83, an ammonium bicarbonate product centrifuge 84, a second mother liquor tank 85, a seventh pump 86, and an eighth pump 87, wherein the carbon dioxide absorption tower 81 comprises a second tank body 811, a second cooling device 812 positioned inside the second tank body 811, and a third spraying device 813 and a fourth spraying devices 814 positioned at the upper part and the middle part of the second tank body 811; and the outlet of the fourth pump 13 is connected with the third spraying device 813 through a pipeline.

The induced draft fan 2 is connected with the gas inlet of the first heat exchanger 3 through a pipeline, the exhaust port of the first heat exchanger 3 extends into the lower part of an inner cavity of the first tank body 711 through a pipeline, the bottom of the first tank body 711 is connected with the inlet of the fifth pump 76 through a pipeline, the outlet of the fifth pump 76 is connected with the inlet of the second heat exchanger 72 through a pipeline, the outlet of the second heat exchanger 72 is connected with the inlet of the sulfur dioxide crystallization tank 73 through a pipeline, the outlet of the sulfur dioxide crystallization tank 73 is connected with the inlet of the ammonium sulfate product centrifuge 74 through a pipeline, the outlet of the ammonium sulfate product centrifuge 74 is connected with the inlet of the first mother liquor tank 75 through a pipeline, the outlet of the first mother liquor tank 75 is connected with the sixth pump 77 through a pipeline, the sixth pump 77 is connected with the second spraying device 714 through a pipeline, a first pipeline 9 is connected between the inlets of the fifth pump 76 and the sixth pump 77; the high-concentration ammonia water storage tank 4 is respectively connected with the inlets of the first pump 5 and the second pump 6 through pipelines, the outlets of the first pump 5 and the second pump 6 are respectively connected with the second spraying device 714 and the fourth spraying device 814; the upper part of the first tank body 711 is communicated with the lower part of the inner cavity of the second tank body 811 through an exhaust pipe 7111, a first cooling water inlet pipe 7121 of the first cooling device 712 and a second cooling water inlet pipe 8121 of the second cooling device 812 are respectively connected with a cooling water inlet pipe 31 of the first heat exchanger 3; a first cooling water outlet pipe 7122 of the first cooling device 712 and a second cooling water outlet pipe 8122 of the second cooling device 812 are respectively connected with a cooling water outlet pipe 32 of the first heat exchanger 3; a first regulating valve 10 and a second regulating valve 50 are respectively arranged on the first cooling water inlet pipe 7121 and the second cooling water inlet pipe 8121; the bottom of the second tank body 811 is connected with the inlet of the seventh pump 86 through a pipeline, the outlet of the seventh pump 86 is connected with the inlet of the third heat exchanger 82 through a pipeline, the outlet of the third heat exchanger 82 is connected with the inlet of the carbon dioxide crystallization tank 83 through a pipeline, the outlet of the carbon dioxide crystallization tank 83 is connected with the inlet of the ammonium bicarbonate product centrifuge 84 through a pipeline, the outlet of the ammonium bicarbonate product centrifuge 84 is connected with the inlet of the second mother liquor tank 85 through a pipeline, the outlet of the second mother liquor tank 85 is connected with the eighth pump 87 through a pipeline, the eighth pump 87 is connected with the fourth spraying device 814 through a pipeline, and a second pipeline 20 is connected between the inlet of the seventh pump 86 and the inlet of the eighth pump 87.

A process employing the system described above for capture and absorption of sulfur dioxide and carbon dioxide comprises following steps of:

(1) pumping flue gas of coal-fired power plant after dedusting treatment into a first heat exchanger 3 via an induced draft fan 2, and cooling through the first heat exchanger 3 to a temperature required by a production process;

(2) letting the flue gas of the coal-fired power plant after dedusting and cooling treatment enter an inner cavity of a sulfur dioxide absorption tower 71 via the first heat exchanger 3 and a bottom of the sulfur dioxide absorption tower 71, pumping dilute ammonia water absorption solution capable of capturing and absorbing sulfur dioxide, from a dilute ammonia water storage tank 11 into a first spraying device 713 of the sulfur dioxide absorption tower 71 through a third pump 12 and spraying downward; controlling a reaction temperature in the sulfur dioxide absorption tower 71 to be within a range of 65-80° C. through a first cooling device 712, wherein specifically the reaction temperature of the solution in the sulfur dioxide absorption tower 71 is controlled by regulating a circulation quantity of water through a first regulating valve 10 on a first cooling water inlet pipe 7121 of the first cooling device 712; thus allowing the flue gas and the dilute ammonia water absorption solution to be in countercurrent contact to undergo gas-liquid dual-phase reaction, and generating an ammonium sulfate solution through absorption of sulfur dioxide, wherein a chemical reaction takes place in two processes: a first process of chemical reaction between the dilute ammonia water and sulfur dioxide to generate ammonium sulfite, and a second process of chemical reaction between the ammonium sulfite and the ammonia water to generate ammonium sulfate; and then letting the flue gas after a removal of sulfur dioxide enter a carbon dioxide absorption tower 81 through an exhaust pipe 7111;

(3) stopping an injection of the dilute ammonia water absorption solution into the sulfur dioxide absorption tower 71 when unsaturated ammonium sulfate solution in the sulfur dioxide absorption tower 71 reaches a liquid level required by the process;

(4) when spraying downward the dilute ammonia water absorption solution through the first spraying device 713 of the sulfur dioxide absorption tower 71, pumping the ammonium sulfate solution in the sulfur dioxide absorption tower 71 into a second heat exchanger 72 via a fifth pump 76 for cooling, then sending into a sulfur dioxide crystallization tank 73, further sending saturated ammonium sulfate crystalline solid and the unsaturated ammonium sulfate solution together into an ammonium sulfate product centrifuge 74 through a pipeline for solid-liquid separation, separating out the crystalline solid of ammonium sulfate fertilizer, discharging the remaining unsaturated ammonium sulfate solution into a first mother liquor tank 75 through the pipeline, then sucking out and pumping into a second spraying device 714 of the sulfur dioxide absorption tower 71 through a sixth pump 77 for downward spraying, enabling the unsaturated ammonium sulfate solution at the bottom of the sulfur dioxide absorption tower 71 to pass through a first pipeline 9, and directly pumping into the second spraying device 714 of the sulfur dioxide absorption tower 71 for downward spraying through the sixth pump 77 on the first pipeline 9, and allowing countercurrent absorption reaction to occur between the sulfur dioxide gas in the flue gas inside the sulfur dioxide absorption tower 71 and the downward sprayed absorption solutions which include the unsaturated ammonium sulfate solution and the previously sprayed dilute ammonia water absorption solution, with both solutions working either simultaneously or separately, thus achieving absorption of sulfur dioxide and turning the ammonium sulfate solution from the unsaturated solution to the saturated solution;

(5) pumping high-concentration ammonia water from a high-concentration ammonia water storage tank 4 through a first pump 5, and supplementing the high-concentration ammonia water into the sulfur dioxide absorption tower 71 in which the separation of ammonium sulfate fertilizer product has been completed, thus restoring the concentration of the solution in the sulfur dioxide absorption tower 71 to a concentration level of the dilute ammonia water absorption solution as at the beginning, which is 6%-8% by mass;

(6) allowing the flue gas of the coal-fired power plant after the sulfur dioxide removal treatment to enter the carbon dioxide absorption tower 81 from the bottom, pumping the dilute ammonia water absorption solution capable of capturing and absorbing carbon dioxide from the dilute ammonia water storage tank 11 into a third spraying device 813 of the carbon dioxide absorption tower 81 through a fourth pump 13 and spraying downward, controlling the reaction temperature in the carbon dioxide absorption tower 81 to be within the range of 40-50° C. through a second cooling device 812, wherein specifically the reaction temperature of the solution in the carbon dioxide absorption tower 81 is controlled by regulating the circulation quantity of the water through a second regulating valve 50 on a second cooling water inlet pipe 8121 of the second cooling device 812, thus allowing the flue gas and the dilute ammonia water absorption solution to be in countercurrent contact to undergo gas-liquid dual-phase reaction, and generating an ammonium bicarbonate solution through absorption of carbon dioxide, and then exhausting the flue gas after the removal of sulfur dioxide and carbon dioxide through the pipeline at a top of the carbon dioxide absorption tower 81;

(7) stopping the injection of the dilute ammonia water absorption solution into the carbon dioxide absorption tower 81 when the unsaturated ammonium bicarbonate solution in the carbon dioxide absorption tower 81 reaches the liquid level required by the process;

(8) when spraying downward the dilute ammonia water absorption solution through the third spraying device 813 of the carbon dioxide absorption tower 81, pumping the ammonium bicarbonate solution in the carbon dioxide absorption tower 81 into a third heat exchanger 82 via a seventh pump 86 for cooling, then sending into a carbon dioxide crystallization tank 83, further sending the saturated ammonium bicarbonate crystalline solid and the unsaturated ammonium bicarbonate solution together into an ammonium bicarbonate product centrifuge 84 through the pipeline for solid-liquid separation, separating out the crystalline solid of ammonium bicarbonate fertilizer, discharging the remaining unsaturated ammonium bicarbonate solution into a second mother liquor tank 85 through the pipeline, then sucking out and pumping into a fourth spraying device 814 of the carbon dioxide absorption tower 81 through an eighth pump 87 for downward spraying, enabling the unsaturated ammonium bicarbonate solution at the bottom of the carbon dioxide absorption tower 81 to pass through a second pipeline 20, and directly pumping into the fourth spraying device 814 of the carbon dioxide absorption tower 81 for downward spraying through the eighth pump 87 on the second pipeline 20, and allowing countercurrent absorption reaction to occur between the carbon dioxide gas in the flue gas inside the carbon dioxide absorption tower 81 and the downward sprayed absorption solutions which include the unsaturated bicarbonate solution and the previously sprayed dilute ammonia water absorption solution, with both solutions working either simultaneously or separately, thus achieving the absorption of carbon dioxide and turning the ammonium bicarbonate solution from the unsaturated solution to the saturated solution;

(9) pumping the high-concentration ammonia water from the high-concentration ammonia water storage tank 4 through a second pump 6, and supplementing the high-concentration ammonia water into the carbon dioxide absorption tower 81 in which the separation of ammonium bicarbonate fertilizer product has been completed, thus restoring the concentration of the solution in the carbon dioxide absorption tower 81 to the concentration level of the dilute ammonia water absorption solution as at the beginning, which is 6%-8% by mass; and

(10) repeating the above steps in a circulating manner.

According to the system and the process for the capture and absorption of sulfur dioxide and carbon dioxide by the ammonia method at normal pressure of the present invention, the sulfur dioxide absorption tower 71 and the carbon dioxide absorption tower 81 are employed to allow sulfur dioxide and carbon dioxide in the flue gas of the coal-fired power plant to respectively undergo countercurrent contact and thorough reaction with the dilute ammonia water absorption solution, and respectively generate the ammonium sulfate solution and the ammonium bicarbonate solution; the produced unsaturated ammonium sulfate solution and the ammonium bicarbonate solution are to be used in a flexible manner, the processing step of supplementing the high-concentration ammonia water is added, and the first cooling device 712 and the second cooling device 812 are respectively arranged in the sulfur dioxide absorption tower 71 and the carbon dioxide absorption tower 81; so that the production working conditions required by the process can be well controlled, the sulfur dioxide and carbon dioxide gas in the flue gas of the coal-fired power plant can be well captured and absorbed, the desulfurization and carbon reduction efficiency is high, the emission of the sulfur dioxide and carbon dioxide greenhouse gas is reduced, the ammonium sulfate and ammonium bicarbonate fertilizers are simultaneously produced; the unique design of the process pipeline can enable the capture system to operate flexibly, reduce the power consumption during the operation of the system, and meanwhile, more effectively enhance the capture and absorption capability of the sulfur dioxide and carbon dioxide gas in the flue gas of the coal-fired power plant; and the system and the process of the present invention have simple process flow, simplified system structure, and low investment and operation costs.

The above embodiments are merely used for describing the preferential ways of implementation of the present invention, and do not impose any limits on the scope of the invention; and on the premise of not deviating from the design spirit of the present invention, various deformations and improvements to the technical scheme of the invention made by those skilled in the field shall fall within the protection scope of the present invention defined by the claims.

INDUSTRIAL APPLICABILITY

The system and the process for the capture and absorption of sulfur dioxide and carbon dioxide by the ammonia method at normal pressure of the present invention are mainly applied to flue gas purification and emission reduction of sulfur dioxide and carbon dioxide in the coal-fired power plant, the sulfur dioxide and carbon dioxide gas in the flue gas of the coal-fired power plant can be well captured and absorbed, the desulfurization and carbon reduction efficiency is high, the emission of the sulfur dioxide and carbon dioxide greenhouse gas is reduced, and the ammonium sulfate and the ammonium bicarbonate fertilizers are simultaneously produced, so that the industrial applicability is very high.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system for capture and absorption of sulfur dioxide and carbon dioxide by an ammonia method at normal pressure, comprising a dilute ammonia water supply device (1), a sulfur dioxide absorption device (7) and a carbon dioxide absorption device (8), wherein the sulfur dioxide absorption device (7) comprises a normal-pressure sulfur dioxide absorption tower (71), a second heat exchanger (72), a sulfur dioxide crystallization tank (73), an ammonium sulfate product centrifuge (74), a first mother liquor tank (75), and a fifth and a sixth pumps (76, 77); further, the sulfur dioxide absorption tower (71) comprises a first tank body (711), a first cooling device (712) positioned inside the first tank body (711), and a first and a second spraying devices (713, 714) positioned at an upper part and a middle part of the first tank body (711); the carbon dioxide absorption device (8) comprises a normal-pressure carbon dioxide absorption tower (81), a third heat exchanger (82), a carbon dioxide crystallization tank (83), an ammonium bicarbonate product centrifuge (84), a second mother liquor tank (85), and a seventh and a eighth pumps (86, 87); further, the carbon dioxide absorption tower (81) comprises a second tank body (811), a second cooling device (812) positioned inside the second tank body (811), and a third and a fourth spraying devices (813, 814) positioned at an upper part and a middle part of the second tank body (811); the dilute ammonia water supply device (1) is respectively connected with the first and the third spraying devices (713, 813) through pipelines; an induced draft fan (2) is connected with the gas inlet of a first heat exchanger (3) through the pipeline; an exhaust port of the first heat exchanger (3) extends into a lower part of an inner cavity of the first tank body (711) through the pipeline; a bottom of the first tank body (711) is connected with an inlet of the fifth pump (76) through the pipeline; an outlet of the fifth pump (76) is connected with an inlet of the second heat exchanger (72) through the pipeline; an outlet of the second heat exchanger (72) is connected with an inlet of the sulfur dioxide crystallization tank (73) through the pipeline an outlet of the sulfur dioxide crystallization tank (73) is connected with an inlet of the ammonium sulfate product centrifuge (74) through the pipeline; an outlet of the ammonium sulfate product centrifuge (74) is connected with an inlet of the first mother liquor tank (75) through the pipeline; an outlet of the first mother liquor tank (75) is connected with the sixth pump (77) through the pipeline; the sixth pump (77) is connected with the second spraying device (714) through the pipeline, a first pipeline (9) is connected between the inlets of the fifth and the sixth pumps (76, 77); a high-concentration ammonia water storage tank (4) is respectively connected with the inlets of the first and the second pumps (5, 6) through the pipelines; the outlets of the first and the second pumps (5, 6) are respectively connected with the second and the fourth spraying devices (714, 814); the upper part of the first tank body (711) is communicated with a lower part of an inner cavity of the second tank body (811) through an exhaust pipe (7111); a first and a second cooling water inlet pipes (7121, 8121) on the first and the second cooling devices (712, 812) are connected together with a cooling water inlet pipe (31) of the first heat exchanger (3) a first and a second cooling water outlet pipes (7122, 8122) on the first and the second cooling devices (712, 812) are connected together with a cooling water outlet pipe (32) of the first heat exchanger (3) a first and a second regulating valves (10, 50) are respectively arranged on the first and the second cooling water inlet pipes (7121, 8121); a bottom of the second tank body (811) is connected with an inlet of the seventh pump (86) through the pipeline; an outlet of the seventh pump (86) is connected with an inlet of the third heat exchanger (82) through the pipeline; an outlet of the third heat exchanger (82) is connected with an inlet of the carbon dioxide crystallization tank (83) through the pipeline an outlet of the carbon dioxide crystallization tank (83) is connected with an inlet of the ammonium bicarbonate product centrifuge (84) through the pipeline; an outlet of the ammonium bicarbonate product centrifuge (84) is connected with an inlet of the second mother liquor tank (85) through the pipeline; an outlet of the second mother liquor tank (85) is connected with the eighth pump (87) through the pipeline; the eighth pump (87) is connected with the fourth spraying device (814) through the pipeline; and a second pipeline (20) is connected between the inlets of the seventh and the eighth pumps (86, 87).

2. The system for capture and absorption of sulfur dioxide and carbon dioxide by the ammonia method at normal pressure according to claim 1, wherein the dilute ammonia water supply device (1) comprises a dilute ammonia water storage tank (11) and a third and a fourth pumps (12, 13), wherein the dilute ammonia water storage tank (11) is respectively connected with inlets of the third and the fourth pumps (12, 13) through pipelines; outlets of the third and the fourth pumps (12, 13) are respectively connected with the first and the third spraying devices (713, 813); and a first and a second valves (30, 40) are respectively arranged on the pipelines between the dilute ammonia water storage tank (11) and the third and the fourth pumps (12, 13).

3. A process for capture and absorption of sulfur dioxide and carbon dioxide by an ammonia method at normal pressure, comprising following steps of:
 (1) pumping flue gas of coal-fired power plant after dedusting treatment into a first heat exchanger (3) via an induced draft fan (2), and cooling through the first heat exchanger (3) to a temperature required by a production process;
 (2) letting the flue gas of the coal-fired power plant after dedusting and cooling treatment to enter a sulfur dioxide absorption tower (71) form the first heat exchanger (3) via a bottom of the sulfur dioxide absorption tower (71), pumping dilute ammonia water absorption solution capable of capturing and absorbing sulfur dioxide from a dilute ammonia water storage tank (11) into a first spraying device (713) of the sulfur dioxide absorption tower (71) through a third pump (12) and spraying downward, thus allowing the flue gas and the dilute ammonia water absorption solution to be in countercurrent contact to undergo gas-liquid dual-phase reaction, and generating an ammonium sulfate solution, wherein a chemical reaction takes place in two processes: a first process of chemical reaction between the dilute ammonia water and sulfur dioxide to generate ammonium sulfite, and a second process of chemical reaction between the ammonium sulfite and the ammonia water to generate ammonium sulfate; and then letting the flue gas after the removal of sulfur dioxide enter a carbon dioxide absorption tower (81) through an exhaust pipe (7111);
 (3) stopping an injection of the dilute ammonia water absorption solution into the sulfur dioxide absorption tower (71) when the unsaturated ammonium sulfate solution in the sulfur dioxide absorption tower (71) reaches a liquid level required by the process;
 (4) when spraying downward the dilute ammonia water absorption solution through the first spraying device (713) of the sulfur dioxide absorption tower (71), pumping the ammonium sulfate solution in the sulfur dioxide absorption tower (71) into a second heat exchanger (72) via a fifth pump (76) for cooling, then sending into a sulfur dioxide crystallization tank (73), further sending the saturated ammonium sulfate crystalline solid and the unsaturated ammonium sulfate solution together into an ammonium sulfate product centrifuge (74) through a pipeline for solid-liquid separation, separating out the crystalline solid of ammonium sulfate fertilizer, discharging the remaining unsaturated ammonium sulfate solution into a first mother liquor tank (75) through the pipeline, then sucking out and pumping into a second spraying device (714) of the sulfur dioxide absorption tower (71) through a sixth pump (77) for downward spraying, directly pumping the unsaturated ammonium sulfate solution at the bottom of the sulfur dioxide absorption tower (71) into the second spraying device (714) of the sulfur dioxide absorption tower (71) for downward spraying through the sixth pump (77) on a first pipeline (9), and allowing countercurrent absorption reaction to occur between the sulfur dioxide gas in the flue gas inside the sulfur dioxide absorption tower (71) and the downward sprayed absorption solutions which include the unsaturated ammonium sulfate solution and the previously sprayed dilute ammonia water absorption solution, with both solutions working either simultaneously or separately, thus achieving absorption of sulfur dioxide and turn the ammonium sulfate solution from the unsaturated solution to the saturated solution;

(5) pumping high-concentration ammonia water from a high-concentration ammonia water storage tank (4) through a first pump (5), and supplementing the high-concentration ammonia water into the sulfur dioxide absorption tower (71) in which the separation of ammonium sulfate fertilizer product has been completed, thus restoring the concentration of the solution in the sulfur dioxide absorption tower (71) to a concentration level of the dilute ammonia water absorption solution as at the beginning;

(6) allowing the flue gas of the coal-fired power plant after the sulfur dioxide removal treatment, which is exhausted from the exhaust pipe (7111) at an upper part of the sulfur dioxide absorption tower (71), to enter the sulfur dioxide absorption tower (81) from a bottom, pumping the dilute ammonia water absorption solution capable of capturing and absorbing carbon dioxide from the dilute ammonia water storage tank (11) into a third spraying device (813) in the carbon dioxide absorption tower (81) through a fourth pump (13) and spraying downward, thus allowing the flue gas and the dilute ammonia water absorption solution to be in countercurrent contact to undergo gas-liquid dual-phase reaction, and generating an ammonium bicarbonate solution through absorption of carbon dioxide, and then exhausting the flue gas after the removal of sulfur dioxide and carbon dioxide through the pipeline at a top of the carbon dioxide absorption tower (81);

(7) stopping the injection of the dilute ammonia water absorption solution into the carbon dioxide absorption tower (81) when the unsaturated ammonium bicarbonate solution in the carbon dioxide absorption tower (81) reaches the liquid level required by the process;

(8) when spraying downward the dilute ammonia water absorption solution through the third spraying device (813) of the carbon dioxide absorption tower (81), pumping the ammonium bicarbonate solution in the carbon dioxide absorption tower (81) into a third heat exchanger (82) via a seventh pump (86) for cooling, then sending into a carbon dioxide crystallization tank (83), further sending the saturated ammonium bicarbonate crystalline solid and the unsaturated ammonium bicarbonate solution together into an ammonium bicarbonate product centrifuge (84) through the pipeline for solid-liquid separation, separating out the crystalline solid of ammonium bicarbonate fertilizer, discharging the remaining unsaturated ammonium bicarbonate solution into a second mother liquor tank (85) through the pipeline, then sucking out and pumping into a fourth spraying device (814) of the carbon dioxide absorption tower (81) through an eighth pump (87) for downward spraying, enabling the unsaturated ammonium bicarbonate solution at the bottom of the carbon dioxide absorption tower (81) to pass through a first pipeline (20), and directly pumping into the fourth spraying device (814) of the carbon dioxide absorption tower (81) for downward spraying through the eighth pump (87) on the second pipeline (20), and allowing countercurrent absorption reaction to occur between the carbon dioxide gas in the flue gas inside the carbon dioxide absorption tower (81) and the downward sprayed absorption solutions which include the unsaturated bicarbonate solution and the dilute ammonia water absorption solution, with both solutions working either simultaneously or separately, thus achieving absorption of carbon dioxide and turning the ammonium bicarbonate solution from the unsaturated solution to the saturated solution;

(9) pumping the high-concentration ammonia water from the high-concentration ammonia water storage tank (4) through a second pump (6), and supplementing the high-concentration ammonia water into the carbon dioxide absorption tower (81) in which the separation of ammonium bicarbonate fertilizer product has been completed, thus restoring the concentration of the solution in the carbon dioxide absorption tower (81) to the concentration level of the dilute ammonia water absorption solution as at the beginning; and

(10) repeating the above steps in a circulating manner.

4. The process for capture and absorption of sulfur dioxide and carbon dioxide by the ammonia method at normal pressure according to claim 3, wherein the reaction temperature in the sulfur dioxide absorption tower (71) is controlled to be within the range of 65-80° C. through the first cooling device (712); and the reaction temperature in the carbon dioxide absorption tower (81) is controlled to be within the range of 40-50° C. through the second cooling device (812).

5. The process for capture and absorption of sulfur dioxide and carbon dioxide by the ammonia method at normal pressure according to claim 4, wherein the concentration of the dilute ammonia water solution in either of the sulfur dioxide absorption tower (71) and the carbon dioxide absorption tower (81) is controlled to be within the range of 6%-8% by mass.

* * * * *